S. BARDY.
MOTION PICTURE APPARATUS.
APPLICATION FILED JAN. 31, 1918.

1,316,669.

Patented Sept. 23, 1919.
5 SHEETS—SHEET 1.

Witnesses:
Joseph Bardy
Allen Satchaw.

Inventor
Samuel Bardy

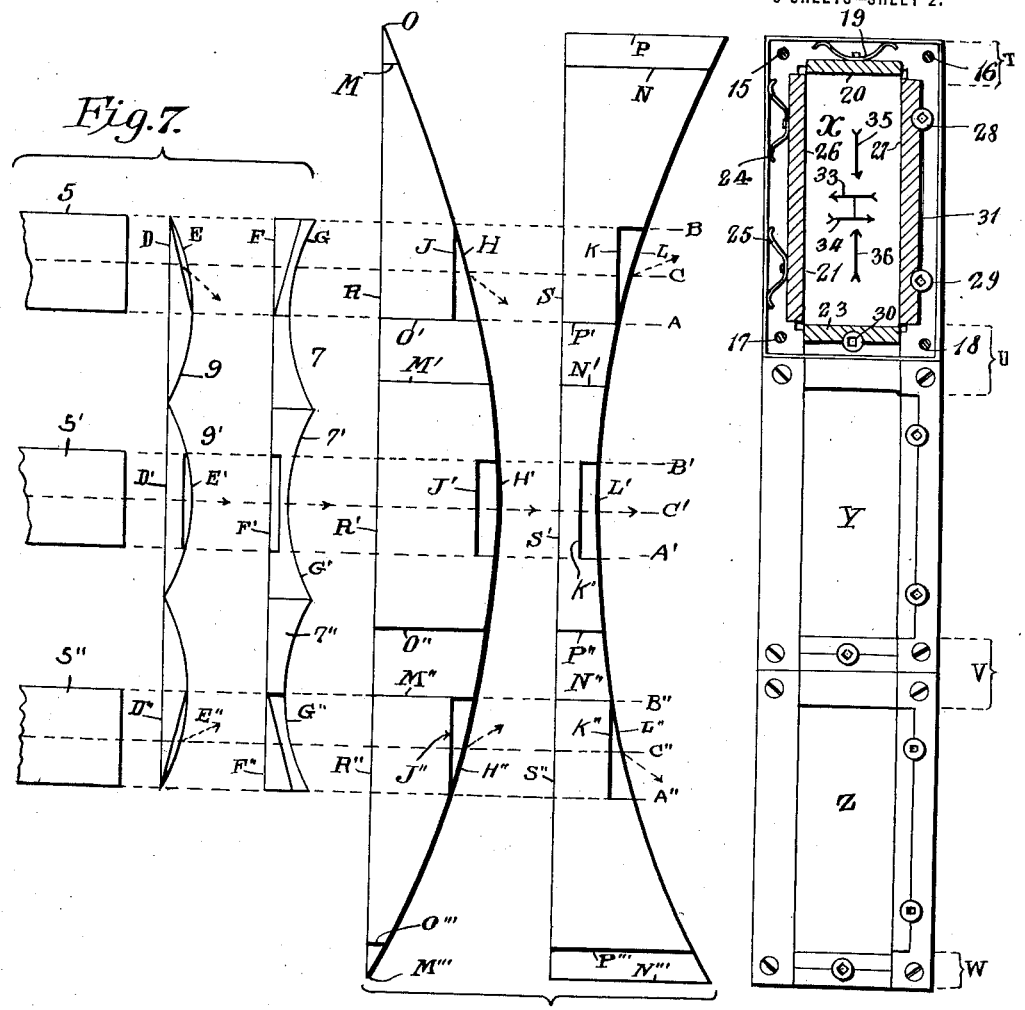

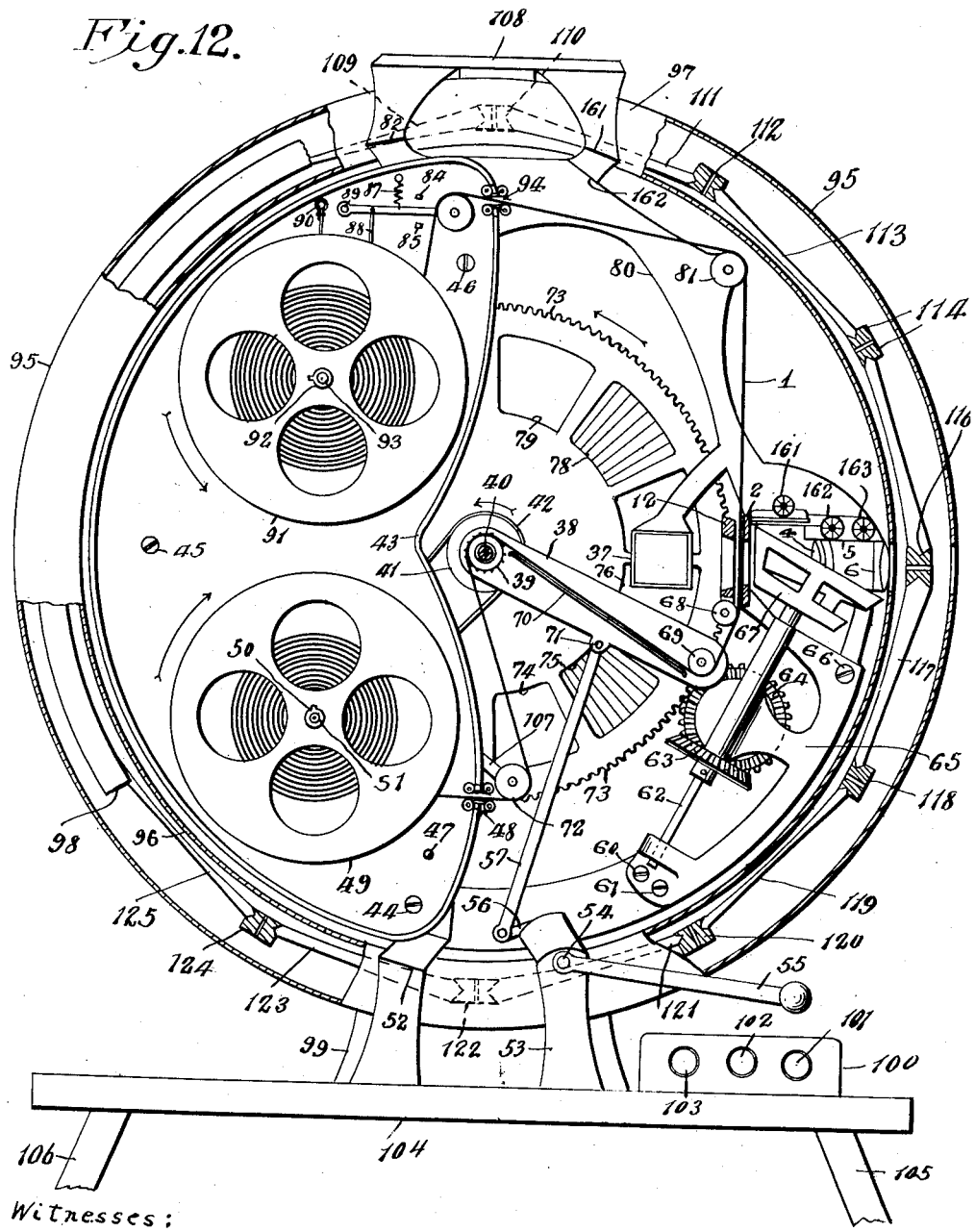

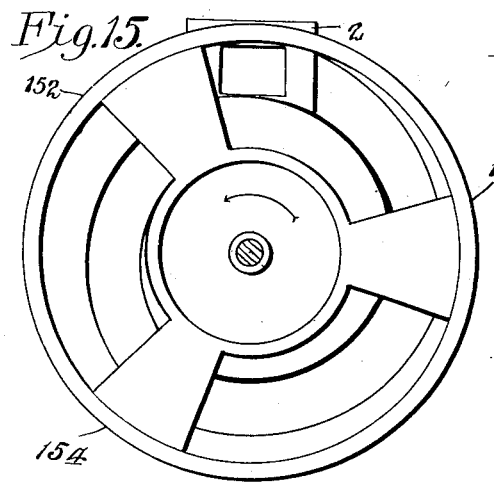
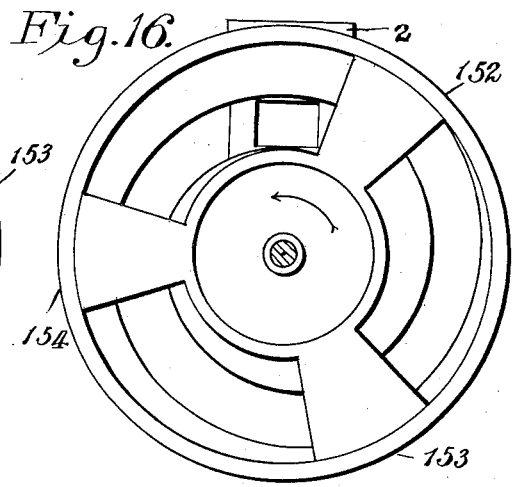
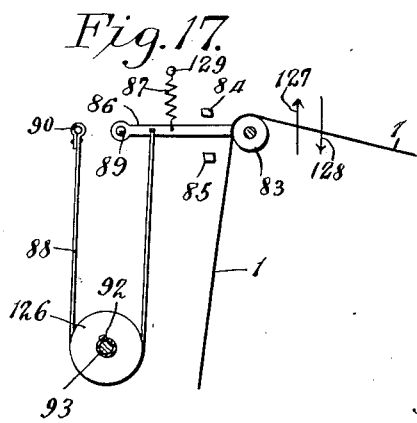
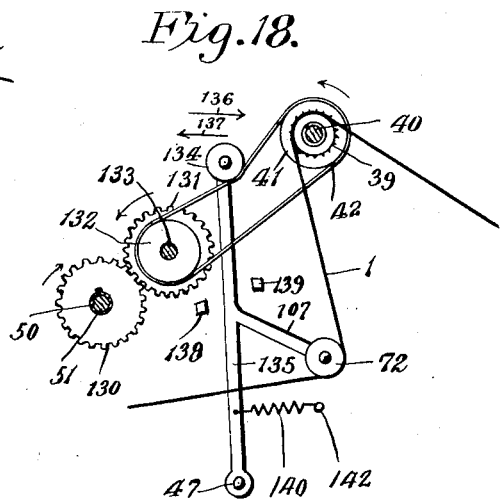
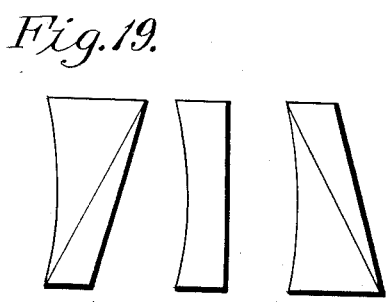

UNITED STATES PATENT OFFICE.

SAMUEL BARDY, OF PHILADELPHIA, PENNSYLVANIA.

MOTION-PICTURE APPARATUS.

1,316,669.   Specification of Letters Patent.   Patented Sept. 23, 1919.

Application filed January 31, 1918. Serial No. 214,771.

*To all whom it may concern:*

Be it known that I, SAMUEL BARDY, a citizen of the United States, residing in the city and county of Philadelphia, State of Pennsylvania, have invented certain new and useful Improvements in Motion-Picture Apparatus, of which the following is a specification.

My invention relates to improvements in motion-picture apparatus for projectors and cameras of the continuously moving film type in which the operating principle is based upon a movable series of optical members.

Although numerous patents have been issued to inventors of continuously moving film apparatus, the fact, which remains very much in evidence, is that the mechanisms of that type have failed completely in supplanting the intermittently moving film apparatus. This fact naturally suggests that something must be radically wrong with the said mechanisms which are either defective optically, mechanically, or both.

The development of my present invention was the result of systematically overcoming certain serious defects found in previous inventions, which has been possible only by the use of sectional lenses for the movable optical elements, which compensate the film movement.

The objects of my invention are:—

First:—To provide a mechanism which will move the film continuously when the instrument is in operation and thus overcome momentum and greatly prolong the life of the film.

Second:—To provide a mechanism having a unit drive for both the movable series of lenses and the film sprocket thus insuring perfect synchronism between the mechanical and optical parts and simplifying the mechanism. It has been my experience that highly satisfactory results are impossible with mechanisms having separate drives, each for the movable optical parts and film sprocket which are mechanically connected by means of gearing.

Third:—To provide a novel system of holding the movable series of lenses so that they will not only be held firmly in place, but will allow freedom for contraction and expansion due to temperature changes.

Fourth:—To provide a novel system of adjusting the movable series of lenses so as to insure a vibrationless projection.

Fifth:—To provide a mechanism which can use the conventional rectilinear projection lens.

Sixth:—To provide a movable series of lenses of such character that they will not interfere with the aplantic and astigmatic properties of the fixed rectilinear projection lens and thus prevent a distortion flicker, *i. e.*, a projected picture which alternately becomes distorted and righted similar to the flicker of a gas flame, which has been characteristic of inventions of the movable lens type previous to my present device.

Seventh:—To eliminate the necessity of interposing reflecting members between the film aperture and the screen without necessitating the looping of the film.

Eighth:—To provide a novel framing device which will not undermine the accuracy of projection.

Ninth:—To provide a novel means of maintaining a uniform tension of the film which is necessary for perfect projection.

Tenth:—To provide a perfect means of eliminating flicker, which depends on a series of interruptions rather than the blending of one image into the other.

Eleventh:—To provide an efficient rotary shield which shall expose only one picture area at a time to the illumination.

Twelfth:—To provide a simple and convenient arrangement of parts with least possible mechanism to operate in conjunction with a perfected optical system and thereby obtain a much higher standard of steadiness of projected image than obtainable with the intermittent type of apparatus.

Other objects and advantages will be apparent upon examining my specifications.

I attain these objects by the mechanism shown in the accompanying drawings, which are given for illustrative purposes, but not to limit my invention.

Figs. 7 and 8 illustrate the development of the basic optical principle for use in my present apparatus.

Fig. 9 represents the novel adjustable holding means for the movable series of lenses.

Figs. 10 and 11 illustrate two forms of properly distributing the illumination over a film aperture encompassing, vertically, the width of two picture areas, or an aperture in which the vertical and lateral dimensions are respectively an inch and a half, by one inch.

Fig. 12 is an elevation view of the machine from the operator's side and having parts cut away in section.

Figs. 15 and 16 illustrate the working principle of the rotary shield designed to expose one picture area at a time to the action of the lenses.

Fig. 17 illustrates a tension-controlling means for the film between the upper or feed-reel and the film sprocket.

Fig. 18 illustrates a novel means for perfectly maintaining even tension of the film between the film sprocket and the take-up reel.

Figs. 19, 20 and 21 illustrate a novel means of rendering the movable series of lenses practically achromatic.

Figure 1:
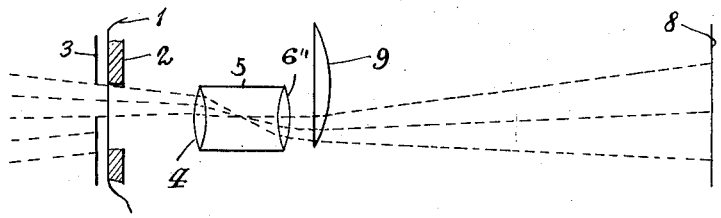
Figures 1, 2, 3, 4, 5 and 6 illustrate the basic optical principle involved.

The basic optical principle of my device is shown diagrammatically in Figs. 1, 2, 3, 4, 5 and 6, in which the downward movement of the film (1) past aperture (2), is compensated for, by a suitable downward movement of convex lens (9), or an upward movement of concave lens (7), so as to render stationary, upon screen (8), an image of a picture area upon moving film (1), according to the well known action of positive and negative lenses. Aperture (2) is, vertically, the width of two picture areas on the film, so as to expose an entire picture area to the illumination and consequent action of the projection lenses during a complete cycle of movement.

Shield (3) is movable and has an aperture sufficient to expose the area of one picture unit on the film, to the illumination emanating from lamp house which is not shown here. The said shield (3) illustrates the action of rotary shield (67) of Figs. 12 and 13 which is in the form of a frustum of a cone and will be explained later in detail.

Figure 2:
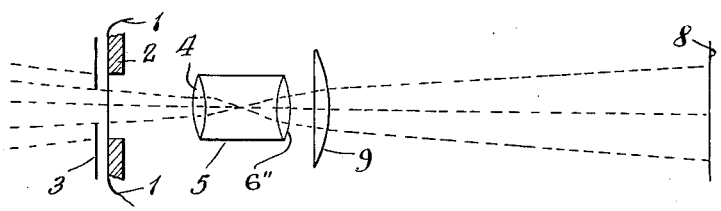
Figure 3:
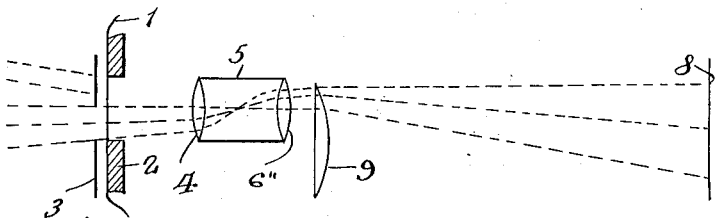
Figure 4:
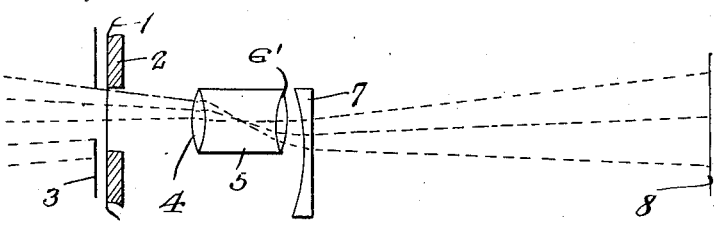
Figure 5:
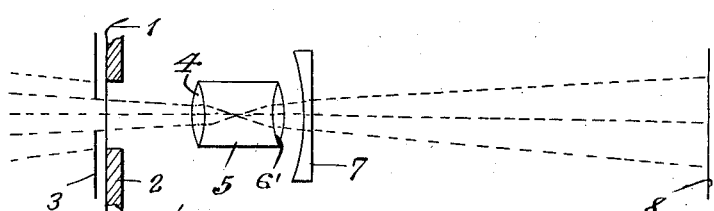
Figure 6:
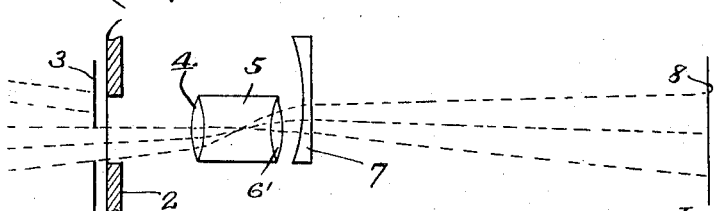

In Figs. 1 and 4 shield (3) exposes a picture area on film (1) at the upper part of aperture (2) and convex lens (9) and concave lens (7) must have their positions as indicated in order to have projected image in the required area on the screen. In Figs. 2 and 5 the picture area on film (1) is in the optical center and the said optical center coincides with the optical center of lenses (7) and (9). Figs. 3 and 6 show the operation when the picture area of film (1) is at the bottom of aperture (2).

Figs. 7 and 8 illustrate, diagrammatically, the development of the optical principle of my device and will, for purposes of explanation, assign two properties to a lens viz:— the property of a lens which has the power of converging or diverging a bundle of rays and secondly, that of a prism which has the power of altering the general course of a bundle of rays. It is by reducing the lens power to the minimum and increasing the prismatic power to the maximum of the movable series of lenses that I accomplish the sixth object and incidentally the other objects as previously stated.

In Fig. 7, a projection lens is represented respectively by the numerals 5, 5′ and 5″. A movable convex lens in three typical positions is represented respectively by the numerals 9, 9′ and 9″ and a movable concave lens in three typical positions as 7, 7′ and 7″. When rays A, B and C, issuing from projection lens 5, pass through convex lens (9), the effect upon the said rays is equivalent to passing through inscribed prism D and lens element E, and in like manner when the said rays A, B and C pass through concave lens (7), the effect upon the said rays is equivalent to passing through inscribed prism F and lens element G.

It is evident that prism D of lens (9) and prism F of lens (7) are the only elements which cause the rays from projection lens (5) to deviate from their original course in a manner indicated in Figs. 3 and 4, whereas lens element E of lens (9) and lens element G of lens (7) are of no desired use whatsoever. It is the said lens elements E of lens (9) and G of lens (7) which are theoretically productive of aberrations of refraction in direct proportion to depth of their curvatures. An element of distortion is introduced in a lens system when refraction takes place through a lens which is off center such as takes place in the first and third positions of same Fig. 7. The said element of distortion also varies in direct proportion to the extent of the depth of the curvature of the said lenses which are off center.

Since there is no such thing as absolute perfection in refraction, it is now quite evident that, in order to get a high degree of perfection, it is necessary to reduce the depth of curvature of the movable series of lenses to such an extent so as to render, the inherent aberrations, microscopic in character, and thereby accomplish the chief object of my invention.

Figure 13:
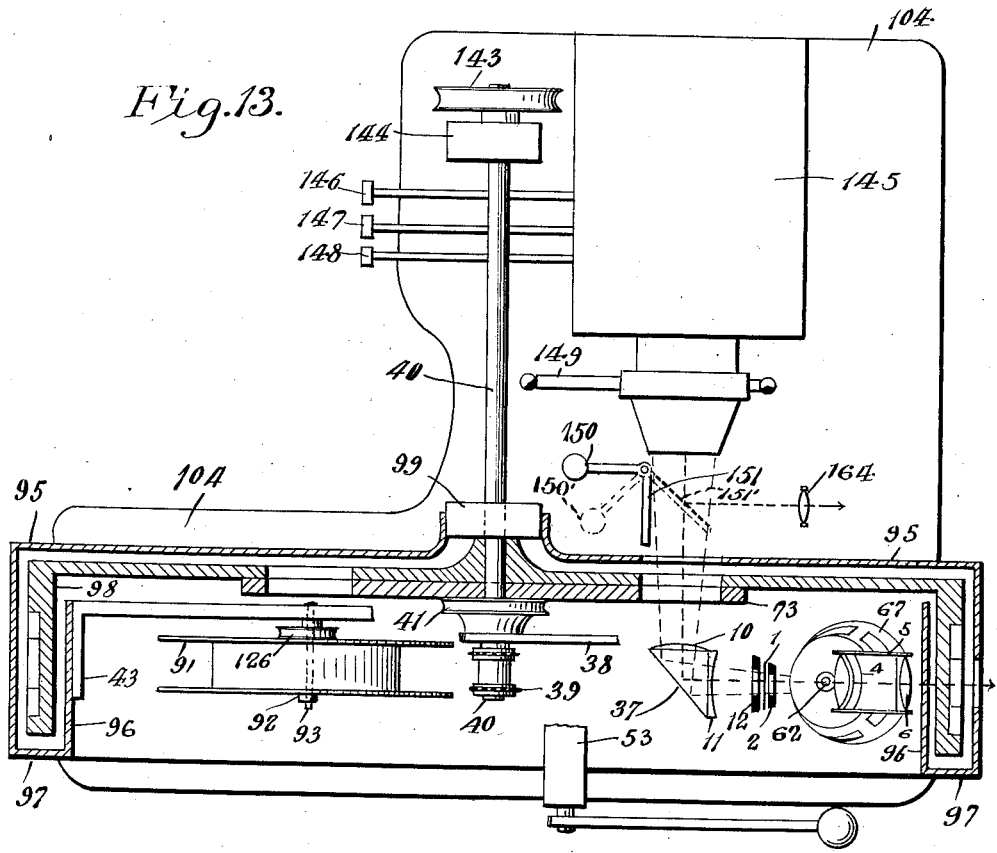
Fig. 13 is a top view of Fig. 12 with most of the parts in section.
Figure 14:
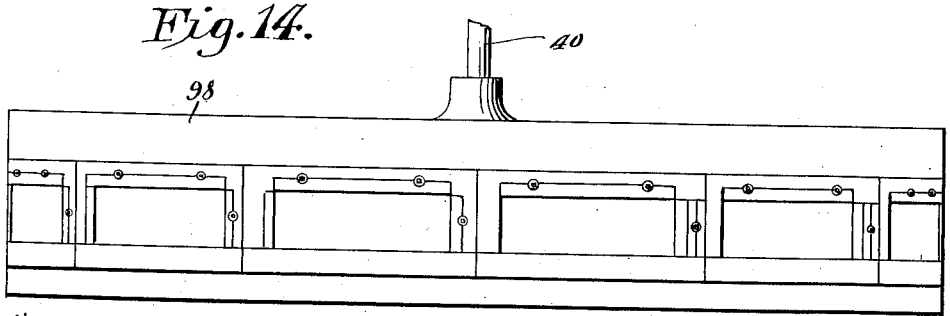
Fig. 14 is a top view of the drum bearing the movable lenses.

The theoretical requirement for the reduction of the depth of curvature of a movable lens, necessary to compensate for the film movement, is the increase of movement of the said movable lens and incidentally its size which is in direct proportion to its focal length viz:—Suppose it requires an inch and a half movement of a lens ten inches in focal length, to compensate for the movement of a film to the extent of the width of one picture area, or three quarters of an inch, in order to project a picture of a certain size at a certain distance away. It would accordingly require a twenty-four inch movement of a lens having a focal length of one hundred and sixty inches to produce the same result. The latter focal length is the average strength of lenses in use for a model such as illustrated in Figs. 12, 13 and 14, in which the curvature of the said lenses, being of such great focal length, is so slight as to be entirely disregarded for all practical purposes.

Fig. 8 is drawn to illustrate the comparison between movable large lenses of slight curvature and movable small lenses of deep curvature such as shown in Fig. 7, in which convex lens, of Fig. 8, is five times the size and focal length of convex lens 9, 9' and 9" of Fig. 7. Concave lens of Fig. 8 is likewise five times the size and focal length of concave lens 7, 7' and 7" of Fig. 7.

It will be observed in Fig. 7 that convex lens 9, 9' and 9" is composed of two elements viz:—a prismatic element in three positions D, D' and D" and a lens element in three positions E, E' and E", which may be considered as present only in that area of the lens proper which refract the rays from the projection lens 5, 5' and 5". It will also be observed that lens element E, E' and E" is constant and is tilted when the lens proper 9 and 9" is off center and when lens proper 9' is in the optical center, lens element E' is right angles to the optical axis of projection lens 5'. This inclination of the said lens element E and E" determines the angle of prismatic element D, D' and D" and the said inclination of lens element varies directly to the extent of which the lens proper is off center and is the cause of distortions, the extent of which varies in direct proportion to the depth of its curvature.

In Fig. 8 the convex lens is likewise divided into three positions of prismatic element J, J' and J", and lens element in three positions H, H' and H". The said lens elements H, H' and H" occupy such positions on the lens proper so that their relative angles of inclination correspond respectively to the inclinations of the lens elements E, E' and E" of Fig. 7. Incidentally, the prism elements J, J' and J" of Fig. 8 thereby correspond, in angularity, to the prism elements D, D' and D" of Fig. 7. The remaining glass portions R, R' and R" of same convex lens of Fig. 8 play no part in this theoretical consideration and may thereby be disregarded.

A comparison of the positions on the lens proper occupied by the prismatic and lens elements of Figs. 7 and 8, illustrate, graphically, my former statement that the amount of movement of a lens, necessary to compensate for the film movement, is in direct proportion to its focal length viz:—Since convex lens of Fig. 8 is five times the focal length of convex lens 9, 9' and 9" of Fig. 7 and that the distance between the optical center of lens element H of Fig. 8, which coincides with the optical center of projection lens (5) of Fig. 7, and the optical center of the convex lens proper of Fig. 8 is five times as great as the distance between the optical center of lens element E of lens proper (9) of Fig. 7, which coincides with the same optical center of projection lens (5). It is also illustrated how lens element E, E' and E" of Fig. 7, which is the cause of distortions, is reduced to a size such as H, H' and H" when the focal length and size of a lens is increased. Hence, if a system, such as illustrated in Fig. 7, is capable of producing distortions, on the screen, to the extent of one inch, a system, such as illustrated in Fig. 8, produces distortions to the extent of one-fifth of an inch on the screen and a system used in a device such as illustrated in Figs. 12, 13 and 14 is capable of reducing distortion to the one-sixty-fourth of an inch or less on the screen which is so minute as to be considered, for all intents and purposes, as non-existent.

The above explanation also holds true for the concave lenses of Figs. 7 and 8, in which three positions of the lens element G, G' and G" and prismatic element F, F' and F", of Fig. 7, bear the same relation to lens element L, L' and L" and prismatic element K, K' and K", of Fig. 8, as illustrated.

It is now understood that my invention calls for a movable series of lenses of considerable size, such as twenty-four inches in diameter which is the size preferably used in my device as illustrated in Figs. 12, 13 and 14. The manufacture of lenses of such size would require disks of optical glass of considerable size and free from defects, which is rarely possible to obtain. Not only would the cost of manufacture be prohibitive, but would be difficult to handle and adjust properly, besides being disadvantageous in other ways to the extent of rendering its use impracticable.

The use of sectional lenses successfully overcomes the objections inherent to lenses of large size as shown in Figs. 8, 9, 12 and 14. Fig. 9 illustrates a holding and adjusting means for the movable lenses, such as convex or concave lens of Fig. 8 divided into three sections. Thus, space X of Fig. 9 is to hold the following lens sections of Fig. 8 viz:—the portion of convex lens between M and O', or the portion of concave lens between N and P'. In like manner space Z of Fig. 9 is to hold portion of convex lens between M" and O''', or portion of concave lens between N" and P'''. The convex and concave lenses of Fig. 8 have the following sections eliminated viz: portion between M and O, M' and O', M'' and O'', M''' and O''', P and N, P' and N', P'' and N'', P''' and N''', in order to allow for the space occupied by the holding means of Fig. 9 which are included in the brackets T, U, V and W. The said sections T, U, V and W are also used for interrupting the refracted illumination as will be explained later.

Space Y of Fig. 9 contains a centered lens system whereas spaces X and Z contain prismatic lens systems, the angles of which may be readily determined by the several prism meters in use by optical instrument and lens makers.

The adjustment of the movable lens systems is illustrated in the same Fig. 9 in which the holding means surrounding lens in space X is shown with the casing removed in order to expose the operating parts.

Movable beams (20), (23), (26) and (27) are grooved in order to properly hold the beveled edges of lens in said space X. Beam (20) has spring (19) attached to it. The said spring (19) presses against a fixed part of holder which naturally causes said beam (19) to press against lens in space X. The said lens in space X is held in place, on its opposite side, by adjustable beam (23). The adjustable means consists of a tapered screw (30) operating between two correspondingly tapered and threaded hemi-conical recessions. One of the said hemi-conical recessions is fixed and is part of holder proper and the other one being movable and part of movable beam (23). The said tapered screw (30) has square shaped socket, into which is inserted a square-shanked wrench when adjusting lens.

It is evident that by causing an ingress of the tapered screw (30) the supported lens would be correspondingly moved upward in the direction of arrow (30). In like manner, by causing an egress of said screw (30), the supported lens would be correspondingly moved downward in the direction of arrow (35). The object of spring (19) is to take up all slack caused by adjustment and temperature, but the tension, upon lens, should be such as to hold the lens securely in place without causing any strain upon it.

Movable beam (27) and (22) operated by adjustable tapered screws (28) and (29) and movable beam (26) and (21) with springs (24) and (25) operate in like manner in adjusting the lens in the directions of arrows (33) and (34).

Screws (15), (16), (17), and (18) serve to secure the adjustable holding means to the revolving drum as can be seen in Figs. 12 and 14 bearing a series of said holding means.

Figs. 12, 13 and 14 illustrate a unit drive system for the optical and mechanical parts in which shaft (40) constitutes the driving means that revolves in bearings (99) and (144) attached to base (104) as shown in Fig. 13. In same Figs. 12 and 13, it can be seen how shaft (40) bears the film sprocket (39), pulley (41) which operates the bottom take-up reel, gear (73) which operates plano-bevel gear (64) which in turn operates bevel gear (63) which contributes its motion to rotary conical slotted shield (67) by means of shaft (62) which may also bear the governor for operating fire-shutter not shown in the drawings which is of the conventional type as required by the fire underwriters. Shaft (40) also operates the drum (98) as shown in Figs. 12, 13 and 14, which bears the movable series of lenses. Framing means (38) operates as a lever and utilizing same shaft (40) as a fulcrum.

Fixed supports (108), (82), (52) and (53) are turned inside the drum of movable lenses (98) and hold additional fixed supports (160), (80), (58) upon which are attached roller (81), prism (37), film aperture (2), film gate (12) having roller (68) attached to it, fixed projection lens system (4), (5) and (6). The detachable bearing and support, for gears (63) and (64), shaft (62) and conical slotted shield (67), are secured to said additional fixed supports (80) and (58) by means of screws (60), (61) and (66). Magazine (43), which contains the film reels (91), (49) and other mechanism, occupies the entire left side of the interior of lens drum (98) and is secured to fixed supports by means of screws (44), (45) and (46). Lens drum (98) is inclosed by casing (95), (96) and (97), also attached to fixed supports, which protect the lenses, on said lens drum (98), from dust and possible injury. Obviously, provision must be made for ready access to the said lenses on drum when cleaning the same, such as suitable trap-door means.

In the same Figs. 12 and 13, rod (93) is fixed to the magazine (43), upon which revolves tube (92) with a ridge on its outer surface in the form of a key. Pulley (126) is firmly secured to said key tube (92) and feed reel (91), bearing film (1), having a corresponding hole and key-way, is placed upon said key-tube (92) thereby causing a mechanical connection between feed reel (91) and pulley (126). Any suitable means must be employed to prevent key-tube (92) from slipping off of rod (93) when revolving. Film (1), from feed reel (91), is placed over roller (83) which operates the tension controlling means consisting of the following parts and shown completely in Fig. 17 in which lever (86) operates on fulcrum (89). Posts (84) and (85) determine the limits of movement of said lever (86). Same lever (86) bears the roller (83) and belt (88). Said belt (88) is brought under pulley (126) and then upward and fixed at point (90). Said (87) fixed at (129) contributes the required upward pull upon lever (86). The tension of spring (87) is preferably adjustable.

Belt (88) causes pressure upon pulley (126), which is mechanically connected to reel (91) bearing film (1), and thereby holds in check, the unwinding of said film (1) from said reel (91). The pressure of belt (88) upon pulley (126) is increased when lever (86) is brought upward in the direction of (127) as caused by upward pull of spring (87). In like manner pressure of said belt (88) upon said pulley (126) is reduced or released when lever (86) is forced downward in the direction of arrow (128) as would be caused by pressure of film (1) upon roller (83). In this manner a constant tension is maintained on film (1) directly governed by the tension of spring (129). It is evident that a weight and gravity means may be substituted for said spring (87).
The film (1), after being placed over roller (83), is passed through fire valve (94) and then over film aperture (2), and film gate (12) is closed upon said film and thereby causing the necessary flattening of the film at the aperture. The film is then passed under roller (68) which is attached to film gate (12) and under roller (69) which is attached to framing means (38) which frames by a lever motion upon shaft (40) as a fulcrum. The operation of framing means is accomplished by means of lever (55) which is fixed to shaft (54) operating in bearing (53). Said shaft (54) operates small lever (56) which contributes motion to framing means (38) by means of connecting rod (57). The principle of framing needs no explanation as it is well-known. Plate (70) is attached to framing means (38) and has runners similar to those in the film aperture
(2) or gate (12) and its use is to prevent any possible sagging of film between roller (69) and film sprocket (39). The said plate (70) is so situated as to just touch the film and maintain its relative position to the film irrespective of the position occupied by the framing device.

The film, after being placed over plate (70) and over film sprocket (39), is then passed under roller (72), through fire valve
(48) and then wound upon lower take-up reel (49).

The take-up mechanism of the usual type does not maintain a uniform tension on the film between the film sprocket (39) and the take-up reel (49) despite assertions to the contrary. The mechanism shown completely in Fig. 18 more accurately controls the tension of the film as follows:—Pulley (41) contributes its motion to pulley (132), which is attached to idler gear (131), by means of belt (42). Idler gear (131) operates gear (130) to which key-tube (50) is attached and revolves upon fixed rod (51). Lever (135) and connecting part (107) have rollers (134) and (72) attached to it and operate on fulcrum (47). Posts (138) and (139) determine the limits of movement of the said lever (135). Spring (140) is attached at (142) and contributes a pull in the direction of arrow (136), and tightens belt (42) whereas the pressure of film (1) upon roller (72) tends to move the said lever (135) in the opposite direction as indicated by arrow (137), which loosens the said belt (42). Lower take-up reel (49) is placed upon key-tube (50) so that the key of said key-tube (50) fits into the key-way of the said take-up reel (49). The tension of spring (140) is preferably adjustable. It is also evident that a weight and gravity means may be substituted for the said spring (140).

The film (1), after being passed under roller (72) and through fire-valve (48) is then wound upon lower take-up reel when the mechanism is in operation. Magazine (43) has a suitable covering means which is not shown in the drawings and usually consists of a door and hinge means.

The operation of the mechanisms is preferably accomplished by an electric motor, not shown in the drawings, which turn pulley (143) of Fig. 13 along with the usual means of controlling the speed of operation, or a suitable crank attachment may be added so that it may be operated by hand.

In Fig. 13, source of light, from lamphouse, usually an arc light, is controlled by adjusting rods (146), (147) and (148) and has the same adjustment accomplished on the operating side, as indicated by the extra adjusting rods (103), (102) and (101) on support (100), as shown in Fig. 12.

When desiring to use the lamp-house as a stereopticon, it is only necessary to move lever (150) to the position of (150') and mirror (151) will accordingly occupy position (151') which naturally reflects the illumination through stereopticon projection lens (164). Slide-carrier (149) is accordingly used for stereopticon views.

When using the illumination from lamp house (145) for motion picture projection, the said illumination passes through the slots such as (74), (75), (76), (77), (78) and (79) which are ones exposed to view of a series of twelve slots in Fig. 12. The said slots bear the same relative position to the illumination from the lamp-house (145) as the lens-sections on the drum (98), such as (109), (111), (113), (115), (117), (119), (121), (123) and (125), which are the ones exposed to view of a series of twelve lens-sections, bear in relation to the projection-lens system (4), (5) and (6). In like manner, the radial partitions between the aforesaid slots correspond, in position, to the lateral sections of the lens-holding means on drum (98), such as (110), (112), (114), (116), (118), (120), (122) and (124), which are the ones exposed to view of a series of twelve lateral light-obstructing sections, hence the interruptions of the illumination from the lamp house (145), due to the light-obstructing radial partitions between the slots, such as between (74), (75), (76), (77), (78) and (79) which are the ones exposed to view, occur when the lateral sections of the lens-holding means on drum (98), such as (110), (112), (114), (116), (118), (120), (122) and (124), which are the ones exposed to view, shall be directly in front of the projection-lens system (4), (5) and (6). In this Fig. 12, the lateral-section (116) is shown directly in front of the said projection-lens system (4), (5) and (6).

Obviously, if this arrangement were not adhered to, there would be unnecessary interruptions of illuminations, with inherent loss of light. The width of each lateral section of the holding means is preferably the width of the fixed projection lens or about an inch and a half so that there shall not be two lenses exposed in front of the fixed projection lenses which would otherwise be productive of a double image on the screen when two prismatic lenses such as (115) and (117) refract the rays from the projection lenses at the same time.

Since film sprocket (39) is a four picture sprocket, that is four picture areas of film (1) are moved past aperture (2) during one complete revolution of said film sprocket (39), consequently there must be four complete lens systems on drum (98) in order to compensate the movement of four picture areas of film and also being that each said complete lens system is preferably formed from three sectional lenses viz:—one centered lens section and two prismatic lens sections, there will naturally be twelve lens sections and twelve ray interrupting sections of the holding means on the lens drum (98).

In a model, such as illustrated, the practical working dimensions would be about thirty inches for the inside diameter of the lens drum (98) and the length of each rectangular lens section about six and a half inches and about an inch and a half wide exclusive of the beveled edge space.

I also use a series of concave lens systems for the movable series instead of convex lens systems on account of being slightly more advantageous.

When a unit picture area on the film (1) is in the center of aperture (2), there will correspondingly be a centered lens section such as (113), (119) or (125) in front of fixed projection lenses and naturally the illumination will be slightly more intense than when projected off center. In order to equalize the intensity of the illumination, I preferably stretch wires arranged radially across apertures opposite a centered lens section such as (78) and (75) in order to reduce the intensity of the illumination to that when projected by the prismatic lens section. Obviously the same result may be accomplished in a variety of ways, but the method illustrated is quite convenient and very effective when properly applied.

It will be recalled that the film aperture (2) and aperture of film gate (12) have the vertical width of two picture areas and that the illumination from the lamp-house, as ordinarily projected, would only cover the area of a one-picture aperture, which obviously cannot be used in my device except when said illumination is made to cover the vertical width of two picture areas.

Fig. 11 illustrates one method of treating the illumination so that it will cover, vertically, the width of two picture areas of film. In said Fig. 11, which is a side view, the dashed lines show how the illumination would ordinarily cover half of the aperture, but concave cylindrical lens (13) spreads out the rays vertically and convex cylindrical lens (14) causes the rays to resume their original converging angle, necessary for perfect projection.

Fig. 10 illustrates another method of treating the illumination, which is somewhat more advantageous than that of Fig. 11, because the film-aperture is brought nearer to the lamp-house and more intense illumination is obtained. In said Fig. 10, which is a top view, the film aperture is brought sufficiently nearer to the lamp-house, so that the illumination will just cover the vertical width of the aperture or twice that of a conventional sized aperture. Naturally the illumination will then also cover twice the required lateral width as illustrated in the same Fig. 10 with a clear loss of fifty per cent. of illumination. Convex cylindrical lens (10) contracts the illumination laterally and concave cylindrical lens (11) causes the rays to resume their original converging angle, necessary for perfect projection. The arrangement of the said two lenses are shown in Fig. 13, in which they are placed opposite the two right faces of prism (37). It is preferable to have said prism (37), lens (10) and lens (11) ground out of one piece of glass and save about twelve per cent. of illumination which would be otherwise wasted on useless reflecting surfaces.

Figs. 15 and 16 are rotary slotted shields in disk form in two extreme positions, drawn for the purpose of illustrating the principle of the conical shaped shield (67) of Figs. 12 and 13. The said conical shaped shield

(67) has the form of a hollow frustum of a cone in which the lateral area corresponds to the shaded portions of Figs. 15 and 16.

In the said Figs. 15 and 16, shaft (62') rotates the disk shield in the direction of the arrows at the rate of one revolution to one complete movement of a unit picture past the aperture. Three interrupting blades (152), (153) and (154) naturally produce three interruptions of illumination per picture, or (48) interruptions per second. The said interrupting blades (152), (153) and (154) interrupt the illumination simultaneously with the lateral sections of the movable lens holding means such as (110), (112), (114), (116), (118), (120), (122) and (124) of Fig. 12.

The general direction of the slotted apertures between the interrupting blades (152), (153) and (154) of the same Figs. 15 and 16, assumes the form of a spiral which follows the downward movement of each successive picture in the aperture (2) as illustrated by the two extreme positions in Figs. 15 and 16. The incompletely obstructed rays of the adjacent picture areas of the film in aperture (2) due to the curved condition of the slotted apertures of the movable shield, are completely absorbed by the universally adopted black border on the screen.

It is obvious that a reciprocatory movable shield may be used to produce the same above result, but I prefer to use a continuous motion as it is unquestionably more efficient mechanically.

Although it is necessary to achromatize each lens section of the movable series in order to attain the highest perfection; nevertheless, it is possible to render, the said lenses, practically achromatic by using two-thirds as many flint glass sections as otherwise required, as shown in Figs. 19, 20 and 21.

It will be recalled that each complete lens system was preferably made up of three sections viz:—a centered lens section and prismatic lens sections and that the curvature of the said lenses was so slight as to be almost negligible as a lens, hence it is only necessary to achromatize the prismatic condition of the said prismatic lens sections by means of suitable prisms of flint glass as shown in Figs. 19 and 21 and the centered lens system, being non-prismatic, requires no correction as shown in Fig. 20. In this manner the cost is materially reduced.

In order to attain highly accurate results the course of the moving film past the aperture should be exactly right angles to the axis of rotation of the movable lenses. Any deviation of the said course would result in a lateral vibration of the image on the screen. Any suitable means may be employed, but preferably the conventional means of guiding the film past the film aperture which usually consists of a roller in three cross sections viz:—a central section which does not press against the film and two flanged sections which support the film. One of the said flanged sections has its position of rotation fixed and the other flanged section, by means of spring tension, is pressed against the central section which in turn presses against the other or rotatably fixed flanged section. The inside measurement between the two flanges, when all of the three sections are pressed together, is slightly less than the width of the film. It can be seen that if the film is forcibly inserted between the two flanges, the said film will be constantly pressed against the rotatably fixed flange by means of the flange with spring tension and thus guiding the said film in a constant path.

I would have such a flanged roller means substituted for roller (68) and roller (81). I also would have the rotatably fixed flanged sections of both rollers (68) and (81) on the same side and have the lateral position of the said rotatably fixed flanged section, of roller (81), screw adjustable in order to accurately adjust the path of the film.

In order to properly adjust the movable compensating lenses so as to exactly neutralize the movement of the film and at the same time preserve the adjustment when focusing the image on the screen, the following facts will serve as a guide viz:—The amount of compensating action of the movable series of lenses is in inverse proportion to their focal length. If the movable series of lenses over-compensates the film movement, it is necessary to increase the size of the image on the screen by decreasing the focal length of the fixed projection lens system and in like manner if there is an under compensation, the remedy would be to decrease the size of the image on the screen by increasing the focal length of the fixed projection lens system. In order to increase the focal length of the fixed projection lens system, it is necessary to increase the distance between the front and back members of the said projection lens system and in like manner by applying the converse in order to decrease the focal length. In Fig. 12 adjusting rod (161) simultaneously moves both the front member (6) and back member (4) of the projection lens system in case (5,) whereas adjusting rod (162) independently moves back member (4) and in like manner, adjusting rod (163) moves the front element (6) of the projection lens system.

If desired a fixed lens, of such focal length as to neutralize the lens action of the movable series of lenses, may be placed next to the said movable series of lenses and in this manner the focusing of the fixed projection lens system is simplified but about six per cent. of light is lost thereby by absorption and reflection. It is evident that if it is desired to have a smaller drum of lenses than as shown in the drawings, the film reels would then have to be placed on the outside of the said drum and the image of the film may readily be brought inside of the drum by means of fixed plane reflecting means, or the film may be brought inside by properly looping, but either way is less advantageous and should not be resorted to except for special purposes. Fixed plane reflecting means, therefore, may or may not be applied to my invention since they play no part in the optical scheme of my invention.

Since variations of the arrangement of parts and mechanical connecting means, for producing the same result, are numerous, I therefore do not wish to restrict myself to the precise details as set forth in the specification or shown in the drawings and that I am at liberty to make any slight changes, without departing from the spirit of my invention.

After having described my device, I make the following claims.

Claims:—

1. In a motion picture machine, the combination with means for continuously moving the film; an optical system including a fixed objective lens system and a movable long focal compensating lens fixed upon a continuously movable carrier, said compensating lens having an effective aperture which is multiple times greater than the aperture of the said fixed objective lens system and movable at a speed which is multiple times the speed of the film movement and means for operating the movable optical and mechanical parts in synchronism.

2. In a motion picture machine, the combination with means for continuously moving the film; an optical system including a fixed objective lens system and a movable series of long focal compensating lenses fixed upon a continuously movable carrier, each lens of the said movable series, having an effective aperture which is multiple times greater than the aperture of the said fixed objective lens system and movable at a speed which is multiple times the speed of the film movement and means for operating the movable optical and mechanical parts in synchronism.

3. In a motion picture machine, the combination with means for continuously moving the film; an optical system including a fixed objective lens system and a movable long focal compensating lens system fixed upon a continuously movable carrier, said compensating lens system having a sectionally extended effective aperture which is multiple times greater than the aperture of the said fixed objective lens system and movable at a speed which is multiple times the speed of the film movement and means for operating the movable optical and mechanical parts in synchronism.

4. In a motion picture machine, the combination with means for continuously moving the film; an optical system including a fixed objective lens system and a movable series of long focal compensating lens systems fixed upon a continuously movable carrier, each lens system, of the said movable series, having a sectionally extended effective aperture which is multiple times greater than the aperture of the said fixed objective lens system and movable at a speed which is multiple times the speed of the film movement and means for operating the movable optical and mechanical parts in synchronism.

5. In a motion picture machine, the combination with means for continuously moving the film; an optical system including a fixed objective lens system and a movable long focal compensating lens fixed upon a continuously movable carrier, said compensating lens having an effective aperture which is multiple times greater than the aperture of the said fixed objective lens system and movable at a speed which is multiple times the speed of the film movement; means adapted to overcome perceptible flicker and plural image effect on the screen and means for operating the movable optical and mechanical parts in synchronism.

6. In a moving picture machine, the combination with means for continuously moving the film; an optical system including a fixed objective lens system and a movable series of long focal compensating lenses fixed upon a continuously movable carrier, each lens, of the said movable series, having an effective aperture which is multiple times greater than the aperture of the said fixed objective lens system and movable at a speed which is multiple times the speed of the film movement; means adapted to overcome perceptible flicker and plural image effect on the screen and means for operating the movable optical and mechanical parts in synchronism.

7. In a motion picture machine, the combination with means for continuously moving the film; an optical system including a fixed objective lens system and a movable long focal compensating lens system fixed upon a continuously movable carrier, said compensating lens system having a sectionally extended effective aperture which is multiple times greater than the aperture of the said fixed objective lens system and movable at a speed which is multiple times the speed of the film movement; means adapted to overcome perceptible flicker and plural image effect on the screen and means for operating the movable optical and mechanical parts in synchronism.

8. In a motion picture machine, the combination with means for continuously moving the film; an optical system including a fixed objective lens system and a movable series of long focal compensating lens systems fixed upon a continuously movable carrier, each lens system, of the said movable series, having a sectionally extended effective aperture which is multiple times greater than the aperture of the said fixed objective lens system and movable at a speed which is multiple times the speed of the film movement; means adapted to overcome perceptible flicker and plural image effect on the screen and means for operating the movable optical and mechanical parts in synchronism.

9. In a motion picture machine, the combination with means for continuously moving the film; an optical system including a fixed objective lens system and a continuously movable compensating lens system; means adapted to prevent the formation of plural image effect on the screen comprising means for exposing the pictures, on the film, singly to the optical system, in combination with means for obstructing the illumination during the periods when the said movable compensating lens system would otherwise produce the said plural image effect on the screen; means adapted to overcome major flicker on the screen by the use of additional illumination obstructing means; means adapted to overcome minor flicker on the screen caused by the slight variations in the intensity of the refracted illumination and means for operating the movable optical and mechanical parts in synchronism.

10. In a motion picture machine, the combination with means for continuously moving the film; an optical system including a fixed objective lens system and a continuously movable compensating lens system; means adapted to prevent the formation of plural image effect on the screen comprising means for exposing the pictures, on the film, singly to the optical system, in combination with means for obstructing the illumination during the periods when the said movable compensating lens system would otherwise produce the said plural image effect on the screen; means adapted to overcome major flicker on the screen by the use of additional illumination obstructing means; means adapted to overcome minor flicker on the screen caused by the slight variations in the intensity of the refracted illumination by the use of a series of wire means adapted to partially obstruct the illumination during the more intense periods and means for operating the movable optical and mechanical parts in synchronism.

SAMUEL BARDY.

Witnesses:
ALLEN B. CLEMENT,
MARY DAVIS.